UNITED STATES PATENT OFFICE.

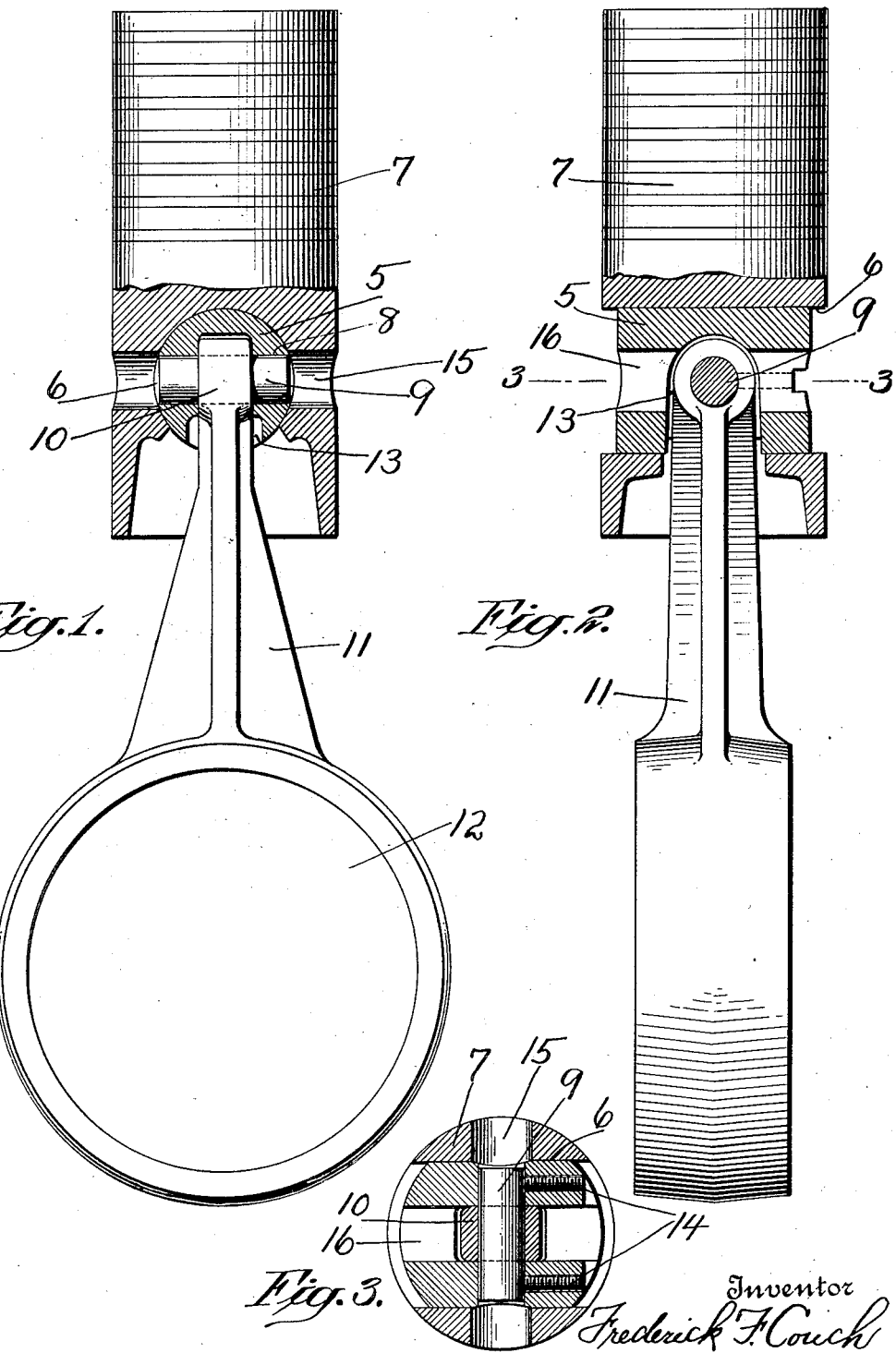

FREDERICK F. COUCH, OF NEW BRUNSWICK, NEW JERSEY, ASSIGNOR, BY MESNE ASSIGNMENTS, TO BRUNSWICK-KROESCHELL COMPANY, OF NEW BRUNSWICK, NEW JERSEY, A CORPORATION OF NEW JERSEY.

KNUCKLE-JOINT CONNECTION.

1,427,361.  Specification of Letters Patent.  Patented Aug. 29, 1922.

Application filed July 6, 1921. Serial No. 482,649.

*To all whom it may concern:*

Be it known that I, FREDERICK F. COUCH, a citizen of the United States, residing in New Brunswick, in the county of Middlesex, in the State of New Jersey, have invented certain new and useful Improvements in Knuckle-Joint Connections, of which the following is a specification.

The invention relates to knuckle joint connections for pistons and rods, and more particularly to an improvement in the knuckle joint connection between the piston and eccentric strap disclosed in U. S. Patent No. 899,583, dated September 29, 1908.

In that patent, the knuckle joint connection between the piston and the eccentric strap consists of a cylindrical transverse bore in the piston, and a cylindrical head formed at one end of the eccentric strap and integrally thereof and received within the transverse bore in the piston. This knuckle joint connection has proved highly efficient in use. It necessitates, however, careful machining of the various parts and a substantially perfect alignment thereof. The object of the present invention is to produce an improved knuckle joint connection between pistons and connecting rods or eccentric straps in order to secure greater efficiency in use, longer wear without necessity for repair, compensation for slight inaccuracies in machining and assembling of the various parts, and provision for repairing or replacement of the knuckle joint connection without dismantling the other parts of the machine. With this object in view, the invention consists in the improved knuckle joint connection hereinafter described and particularly pointed out in the appended claims.

In the accompanying drawings illustrating the preferred form of the invention, Fig. 1 is a front elevation, partly in section, of a piston and an eccentric strap showing the improved knuckle joint connection between them; Fig. 2 is a side elevation, partly in section, of the parts shown in Fig. 1; and Fig. 3 is a section taken along the line 3—3 of Fig. 2.

It will be understood that the improved knuckle joint connection of the present invention is not to be restricted to use for connecting an eccentric strap with a piston, as shown in the drawings. Its application to this use is shown simply for purposes of illustration. The improved knuckle joint connection is adapted for use in connecting parts which at times move together and at other times have a relative movement between them, such parts being exemplified by a piston and a connecting rod. In its application to the purpose of connecting an eccentric strap with a piston, as shown in said patent and illustrated in the accompanying drawings, the improved knuckle joint connection comprises a cylindrical knuckle 5 received within a transverse bore 6 in the lower end of the piston 7, which may be used for the purposes for which the piston shown in said patent is used, or for any other preferred purpose. The knuckle 5 fits snugly within the bore in the piston, yet with sufficient looseness so that it may rotate or oscillate freely therein without lost motion on the part of the piston as it reciprocates in the cylinder.

A wrist pin bore 8 is formed within the knuckle 5 transversely of the longitudinal axis thereof and substantially half way of the length of the knuckle. This bore loosely receives a wrist pin 9 passed through a hole in the head 10 of an eccentric strap 11. The axis of the hole in the head 10 is at right angles to the axis of the eccentric bore 12. The head 10 of the eccentric strap is received in the open-ended recess 13 formed in the knuckle 5 adjacent the transverse bore 8. The wrist pin 9 is secured in the knuckle 5 by means of the headless set-screws 14 arranged in the knuckle at each side of the eccentric strap head, as clearly shown in Fig. 3. In order that the wrist pin 9 may be inserted in place and taken out when necessary, the piston 7 is provided with the bore 15 arranged at right angles to the knuckle bore 6. To lighten its weight, the knuckle 5 may be provided with a central longitudinal bore 16.

It will be recognized by those skilled in the art that the above-described improved knuckle joint connection has many features of advantage which recommend it. The construction and arrangement of the parts compensate for any misalignment between the cylinder bore and the axis of the shaft or any slight inaccuracy in machining the knuckle or the eccentric bore. This compensation is provided for by giving the wrist pin a slight play in the knuckle. Hence when the parts have adjusted themselves in proper alignment, the wear will be uniform and consequently much less. Moreover, by making the knuckle as a piece separate and distinct from the eccentric strap, the knuckle may be machined on centers, thus insuring a true cylindrical shape, which is obviously difficult of accomplishment where the knuckle is formed as a wrist pin integrally with the eccentric strap. By having the knuckle of relatively large diameter, it is possible to have a considerable bearing surface on the under side of the knuckle, as clearly shown in Figs. 1 and 2. In fact, the piston completely encircles the outer ends of the knuckle, as shown in Fig. 2. Thus a relatively larger wearing surface is provided than is possible with knuckle joint connections as heretofore constructed. This construction and arrangement of parts also permits the knuckle bore in the cylinder to be made in solid metal, the necessity for the open lower end heretofore required by former constructions being eliminated. Thus the liability of the metal springing out of true cylindrical shape when it is cut through is obviated. The arrangement of the head of the eccentric strap in the knuckle and its securement therein by means of the transversely arranged wrist pin enables this part of the eccentric strap to be made heavier and of greater strength than has formerly been possible with prior constructions. A particularly commendable advantage over prior constructions is the fact that replacements because of wear are confined simply to providing new knuckles.

Inasmuch as the invention is not to be restricted to application as a connection between a piston and eccentric strap, as shown in the drawings, but is adapted for any and all uses where it is necessary to connect two parts, one of which moves with and relatively to the other, it is to be understood that in the claims the word "piston" is generic as defining any piston-like structure, and the word "rod" is used to designate a connecting rod, an eccentric strap or other member connected to the piston or the like by means of the improved knuckle joint connection.

Having thus described the invention, what is claimed as new is:—

1. A knuckle joint connection for pistons and rods comprising a cylindrical knuckle loosely received in a transverse bore in the piston, and a pin passed through one end of the rod and received in a bore formed in the knuckle at right angles to the longitudinal axis of the knuckle.

2. A knuckle joint for pistons and rods comprising a cylindrical knuckle adapted to be received in a transverse bore in the piston, said knuckle having a bore at right angles to its longitudinal axis for loosely receiving a wrist pin.

3. A knuckle joint connection comprising a cylindrical knuckle having therein a bore transversely of the longitudinal axis of the knuckle for receiving a wrist pin, and a recess adjacent the transverse bore for receiving one end of the connecting rod.

4. A knuckle joint connection for pistons and rods comprising a knuckle having a cylindrical exterior adapted to be received within a bore in the piston, a wrist pin received within a bore in the knuckle formed transversely of the longitudinal axis thereof, said knuckle having adjacent the transverse bore a recess for receiving one end of a rod through which the wrist pin is passed.

5. A knuckle joint connection between a piston and an eccentric strap comprising a knuckle having a cylindrical exterior received within a transverse bore in the piston, a wrist pin in one end of the strap and arranged at right angles to the axis of the eccentric bore, said wrist pin being received in a bore in the knuckle formed transversely of the longitudinal axis thereof.

FREDERICK F. COUCH.